(12) United States Patent
Argibay et al.

(10) Patent No.: US 9,450,366 B2
(45) Date of Patent: Sep. 20, 2016

(54) LONG-LIFE METAL SLIDING CONTACTS

(75) Inventors: Nicolas Argibay, Albuquerque, NM (US); Wallace Gregory Sawyer, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 267 days.

(21) Appl. No.: 13/880,202

(22) PCT Filed: Oct. 26, 2011

(86) PCT No.: PCT/US2011/057815
§ 371 (c)(1),
(2), (4) Date: Apr. 18, 2013

(87) PCT Pub. No.: WO2012/078254
PCT Pub. Date: Jun. 14, 2012

(65) Prior Publication Data
US 2013/0210243 A1    Aug. 15, 2013

Related U.S. Application Data

(60) Provisional application No. 61/406,769, filed on Oct. 26, 2010.

(51) Int. Cl.
*H01R 39/24* (2006.01)
*H02K 13/00* (2006.01)
(Continued)

(52) U.S. Cl.
CPC .............. *H01R 39/24* (2013.01); *H01R 39/00* (2013.01); *H01R 39/46* (2013.01); *H01R 43/00* (2013.01); *H02K 13/00* (2013.01); *H02K 9/28* (2013.01); *Y02E 10/725* (2013.01)

(58) Field of Classification Search
CPC ...... H01R 39/00; H01R 43/00; H01R 39/30; H01R 39/24; H01R 39/22; H01R 39/46; H01R 39/56; H02K 13/10; H02K 23/00; H02K 27/00; H02K 2205/00; H02K 39/22; H02K 39/24; H02K 39/46; H02K 39/56; H02K 13/00
See application file for complete search history.

(56) References Cited

U.S. PATENT DOCUMENTS 265,936 A * 10/1882 Thomson ...................... 310/221
394,095 A * 12/1888 Buckingham ................. 310/221
(Continued)

FOREIGN PATENT DOCUMENTS

GB        190606219 A  *  0/1906
JP        09201014 A   *  7/1997 ............. H02K 13/00
(Continued)

OTHER PUBLICATIONS

Oberg, Erik Jones, Franklin D. Horton, Holbrook L. Ryffel, Henry H.. (2008). Machinery's Handbook (28th Edition) & Guide to Machinery's Handbook—Testing the Hardness of Metals. Industrial Press. Online version available at: http://app.knovel.com/hotlink/pdf/id:kt006DL3B5/machinerys-handbook-28th/testing-hardness-metals.*

(Continued)

*Primary Examiner* — Dang Le
(74) *Attorney, Agent, or Firm* — Thomas Horstemeyer LLP

(57) ABSTRACT

In one embodiment, a sliding contact system includes a first metal contact, a second metal contact in sliding engagement with the first contact, and a lubricant in which the first metal contact and the second metal contact are immersed to inhibit oxidation and cold welding of the contacts.

20 Claims, 3 Drawing Sheets

(51) Int. Cl.
*H01R 39/00* (2006.01)
*H01R 43/00* (2006.01)
*H01R 39/46* (2006.01)
*H02K 9/28* (2006.01)

(56) References Cited

U.S. PATENT DOCUMENTS

| | | | | |
|---|---|---|---|---|
| 2,606,946 | A * | 8/1952 | Fisher | H02K 9/19 |
| | | | | 310/228 |
| 2,703,372 | A * | 3/1955 | Savage | 310/228 |
| 2,855,528 | A * | 10/1958 | Krellner | 310/228 |
| 2,931,927 | A * | 4/1960 | McAdam et al. | 310/67 R |
| 3,668,451 | A * | 6/1972 | McNab | H01R 39/24 |
| | | | | 310/248 |
| 4,659,954 | A * | 4/1987 | Gunnoe, Jr. | H01R 39/26 |
| | | | | 310/228 |
| 5,270,596 | A * | 12/1993 | Shibuya et al. | 310/40 MM |
| 5,361,012 | A * | 11/1994 | Hildebrandt | H01R 39/48 |
| | | | | 310/228 |
| 6,563,245 | B1 * | 5/2003 | Suzuki | B60T 8/4022 |
| | | | | 310/233 |
| 7,375,452 | B2 * | 5/2008 | Kuechen | H01R 39/04 |
| | | | | 310/233 |
| 7,557,485 | B1 * | 7/2009 | Lynch | H01R 39/30 |
| | | | | 310/219 |
| 7,622,844 | B1 * | 11/2009 | Kuhlmann-Wilsdorf | H01R 39/24 |
| | | | | 310/229 |
| 2005/0057102 | A1 * | 3/2005 | Totsu | G03F 7/70758 |
| | | | | 310/12.06 |
| 2009/0291325 | A1 * | 11/2009 | Xu et al. | 428/800 |

FOREIGN PATENT DOCUMENTS

JP 2001136714 A 5/2001
JP 2008223902 A 9/2008

OTHER PUBLICATIONS

The International Search Report and Written Opinion dated Jun. 28, 2012.

The International Preliminary Report on Patentability dated May 10, 2013.

* cited by examiner

LONG-LIFE METAL SLIDING CONTACTS

CROSS-REFERENCE TO RELATED APPLICATION(S)

This application is the 35 U.S.C. §371 national stage of PCT application PCT/US2011/057815, filed Oct. 26, 2011 which claims priority to and the benefit of U.S. Provisional Application Ser. No. 61/406,769, filed Oct. 26, 2010, both of which are hereby incorporated by reference herein in their entirety.

STATEMENT OF GOVERNMENTAL SUPPORT

This invention was made with government support under grant number N00014-09-1-0584, awarded by the Office of Naval Research of the United States government. The government has rights in the invention.

BACKGROUND

Sliding contacts are used in various applications, including motors and generators. Such contacts often comprise a first, stationary contact and a second, rotating contact that is maintained in sliding engagement with the first contact as the second contact rotates relative to the first contact.

Because sliding contacts make physical contact with each other during use, contact wear can be a problem. This is particularly true when higher currents are passed through the contacts. Due to such wear issues, most sliding contacts comprise a metal contact and a graphite brush that brushes across the surface of the metal. Because graphite has a low coefficient of friction, wear is reduced. Conventional graphite and electrographite brushes are not effective above a current density threshold where ohmic heat losses become unmanageable due to the intrinsic bulk resistivity and thermal transport characteristics of these materials. When a graphite brush achieves high temperature due to excessive current density, the threshold being a function of geometry, composition, and environment, water is desorbed from the brush causing catastrophic wear of the brush resulting in system failure. In contrast, metal on metal sliding contacts can be used to pass much higher currents. Therefore, metal on metal sliding contacts would be preferable if it were not for the above-mentioned wear problems.

In view of the above discussion, it can be appreciated that it would be desirable to have metal on metal sliding contacts that are less susceptible to wear.

BRIEF DESCRIPTION OF THE DRAWINGS

The disclosed systems and methods can be better understood with reference to the following drawings. The components in the drawings are not necessarily to scale.

DETAILED DESCRIPTION

As described above, it is desirable to use all metal contacts in motors, generators, and other applications where sliding contacts are needed because a greater current density may be passed through such contacts than through graphite on metal contacts. Unfortunately, metal on metal sliding contacts tend to suffer from increased wear when used to deliver high amounts of current due to susceptibility for electrochemically enhanced corrosion. It has been determined that the high wear rates observed with metal on metal sliding contacts are, in significant part, caused by corrosion of the contacts. It has therefore been determined that the wear rates of metal on metal sliding contacts can be significantly reduced by reducing such corrosion. In sliding contacts embodiments described below, corrosion is reduced by reducing exposure of the contacts to oxygen. In some embodiments, this is achieved by immersing the contacts in a fluid that prevents oxygen from reaching the contacts. In some embodiments, the fluid is a liquid lubricant or a gas that is saturated with a lubricant that condenses on the contacts.

When metal contacts are exposed to air, the exposed surfaces of the contacts form oxide. Although the oxide can be beneficial from the standpoint of preventing welding of two otherwise bare metal surfaces, a phenomenon referred to as cold-welding, oxidation can lead to subsurface fatigue cracks that can result in delamination and the formation of debris particles, which is the primary wear mechanism in low wear metal sliding electrical contact applications. This wear mechanism is more pronounced when higher currents are used because of the effect of the strong electromagnetic fields that are generated by relatively high current transport, by accelerating electrochemical corrosion in the vicinity of the sliding interface. If oxidation can be reduced, however, such delamination can be reduced, vastly increasing the life of the contact.

Although oxidation can be prevented or reduced by simply removing oxygen from the environment in which the contacts are used, the lack of oxidation can lead to cold welding. In particular, the pure metal-to-metal contact that occurs without such oxidation, in combination with increased temperatures resulting from the high current passed and the friction generated, can cause the contacts to melt and weld to each other. Desirable results can be achieved, however, when oxidation is inhibited to reduce wear and lubrication is provided to prevent cold welding. It has been determined that a metal-metal sliding contact system having improved wear characteristics can be obtained by immersing the contacts in a lubricant that both reduces friction between the contacts and reduces oxidation of the contacts. Example embodiments of such systems are described below.

Figure 1:
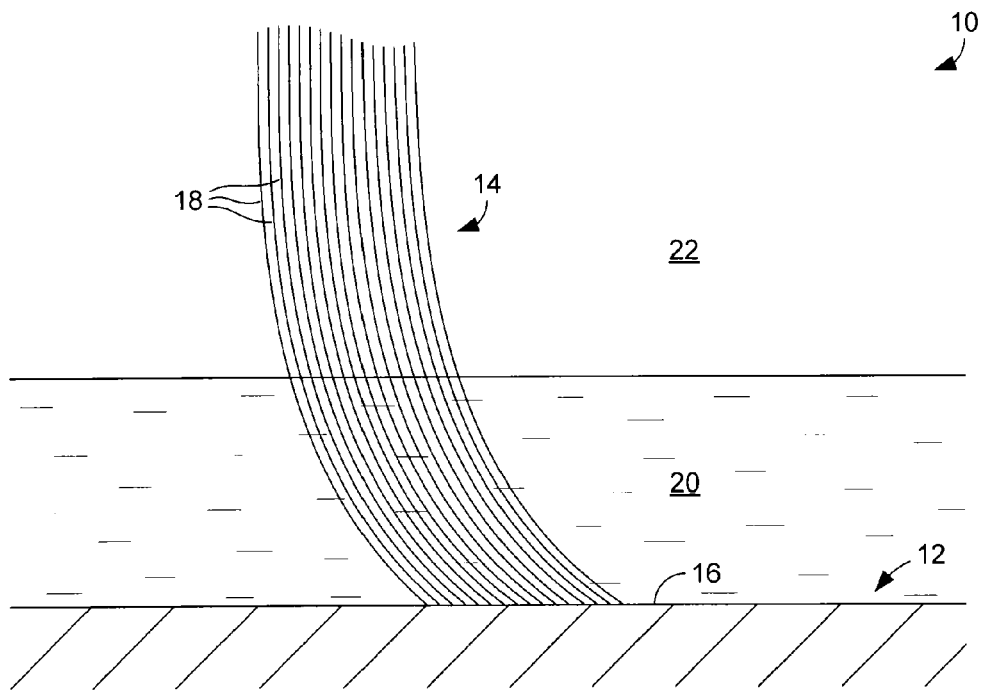
FIG. 1 is a schematic partial side view of a first embodiment of a metal sliding contact system.

FIG. 1 illustrates a first example sliding contact system 10. As indicated in that figure, the system 10 comprises a first contact 12 that engages a second contact 14. One or both of the contacts 12, 14 is moved (e.g., rotated) such that the two contacts slide relative to each other while in physical contact (i.e., sliding engagement). In the example of FIG. 1, the first contact 12 comprises a solid member having an outer surface 16. In some embodiments, the first contact 12 comprises a cylindrical element, such as a commutator or slip ring. As is also illustrated in FIG. 1, the second contact 14 is formed as a brush having multiple bristles 18 that engage the outer surface 16. The contacts 12, 14 are provided within an airtight, sealed casing or housing (not shown) that prevents escape and/or evaporation of a lubricant (described below) present within the system 10.

Irrespective of their particular configurations, the contacts 12, 14 are both metal contacts. Suitable metals comprise any metal or metal alloy that is highly conductive but that may oxidize and therefore may be susceptible to increased wear when high current is passed through it. Example metals include copper, iron, aluminum, silver, nickel, molybdenum, tin, and other metals that can be added to those metals to form metal alloys (e.g., brass, bronze, and steel). In some embodiments, the metals are selected such that the second contact 14 (i.e., brush contact) is significantly harder than the first contact 12. In such a case, wear is "shifted" from the contact that is most susceptible to wear (i.e., the second contact 14 with its narrow bristles 18) to the contact that is less susceptible to wear (i.e., the first contact 12 with its greater thickness and larger mass of material). In one example embodiment, the first contact 12 is made of copper and the second contact 14 (i.e., the bristles 18) are made of beryllium copper, which is much harder than pure copper. In another example embodiment, the first contact 12 is made of copper and the bristles 18 of the second contact 14 is made of steel, which is also much harder than copper. In a further example embodiment, the first contact 12 is made of copper and the second contact 14 is made of hardened brass, which is much harder than copper. In a yet another example embodiment, the first contact 12 is made of copper and the second contact 14 is made of argentium silver, which is likewise much harder than copper. These are just but a few examples of metals and metal pairings that can be used.

With further regard to FIG. 1, at least the portions of the contacts 12, 14 that come into engagement with each other are immersed in a lubricant 20. In the embodiment illustrated in that figure, the contact areas of the contacts 12, 14 are submerged in a liquid lubricant. As indicated in FIG. 1, the lubricant 20 can comprise a pool of liquid that is covered with a gas 22. In some embodiments, the gas 22 comprises air. In other embodiments, the gas 22 comprises an inert gas other than oxygen, such as helium, argon, or nitrogen. In alternative embodiments, the system 10 can be completely filled with the lubricant 20 such that little or no gas is within the sealed casing or housing that contains the system.

The lubricant 20 can comprise any liquid that reduces friction between the contacts 12, 14, cools the contacts to prevent metal-to-metal welding, and inhibits oxidation. In some embodiments, the lubricant 20 comprises a fluorinated liquid or an alcohol. Example fluorinated liquids include hydrofluoroether solutions (e.g., Novec 7500 by 3M Corp.). Example alcohols include ethanol and propanol solutions.

Figure 2:
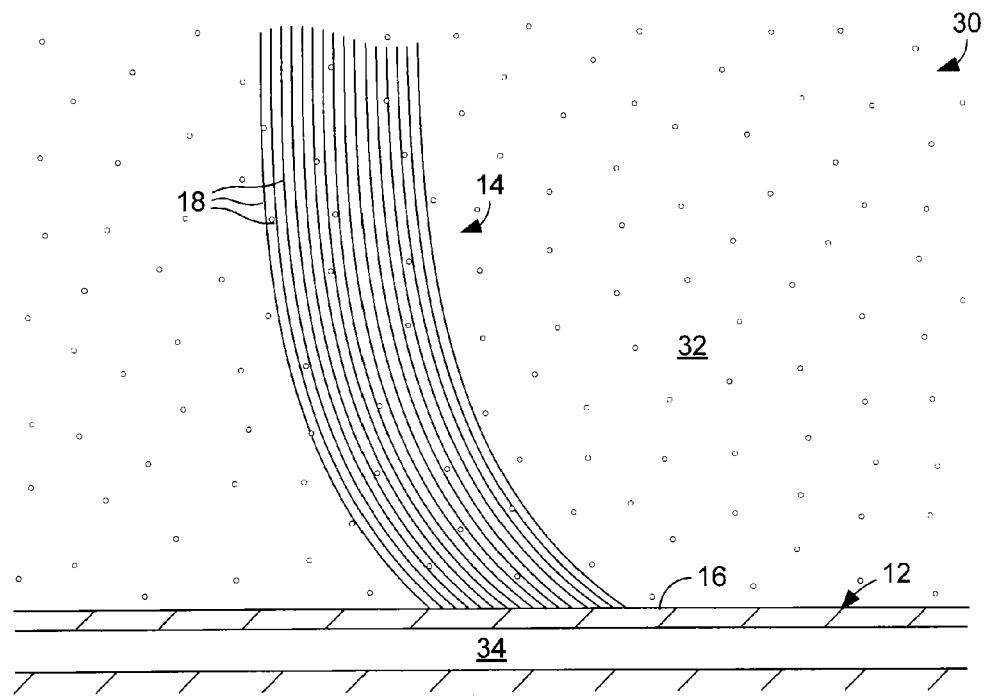
FIG. 2 is a schematic partial side view of a second embodiment of a metal sliding contact system.

Because a liquid lubricant can create drag, it is possible that submersion of the contacts will limit the speed at which equipment in which the contacts are used (e.g., motor or generator) can be operated. In such cases, it may be preferable to provide the lubricant in the form of a saturated gas. Such an embodiment is illustrated in FIG. 2. The sliding contact system 30 of FIG. 2 is similar in many ways to the system 10 of FIG. 1. Therefore, the system 30 comprises a first metal contact 12 that engages a second metal contact 14 having a plurality of bristles 18. In addition, the contacts 12, 14 are immersed in a lubricant. In this case, however, the lubricant comprises a gas 32 that is saturated with a liquid lubricant. The gas 32 can be an inert gas that contains no oxygen. By way of example, the gas can be helium, argon, or nitrogen gas. The lubricant can comprise any of the lubricants identified above. In such a case, the liquid lubricant contained in the gas 32 condenses on one or both of the contacts 12, 14 to provide the desired lubrication and oxidation inhibition. In some embodiments, condensation can be facilitated by cooling one or both of the contacts 12, 14. For example, the contact 12 can be cooled by delivering cooling water or another fluid through one or more passages 34 formed beneath the surface 16 of the contact or in another location. Irrespective of how the condensation occurs, the lubricant that condenses on the contact(s) reduces friction and inhibits oxidation. Because a much smaller volume of liquid lubricant is present, however, drag is reduced and greater operating speeds are possible.

Figure 3:
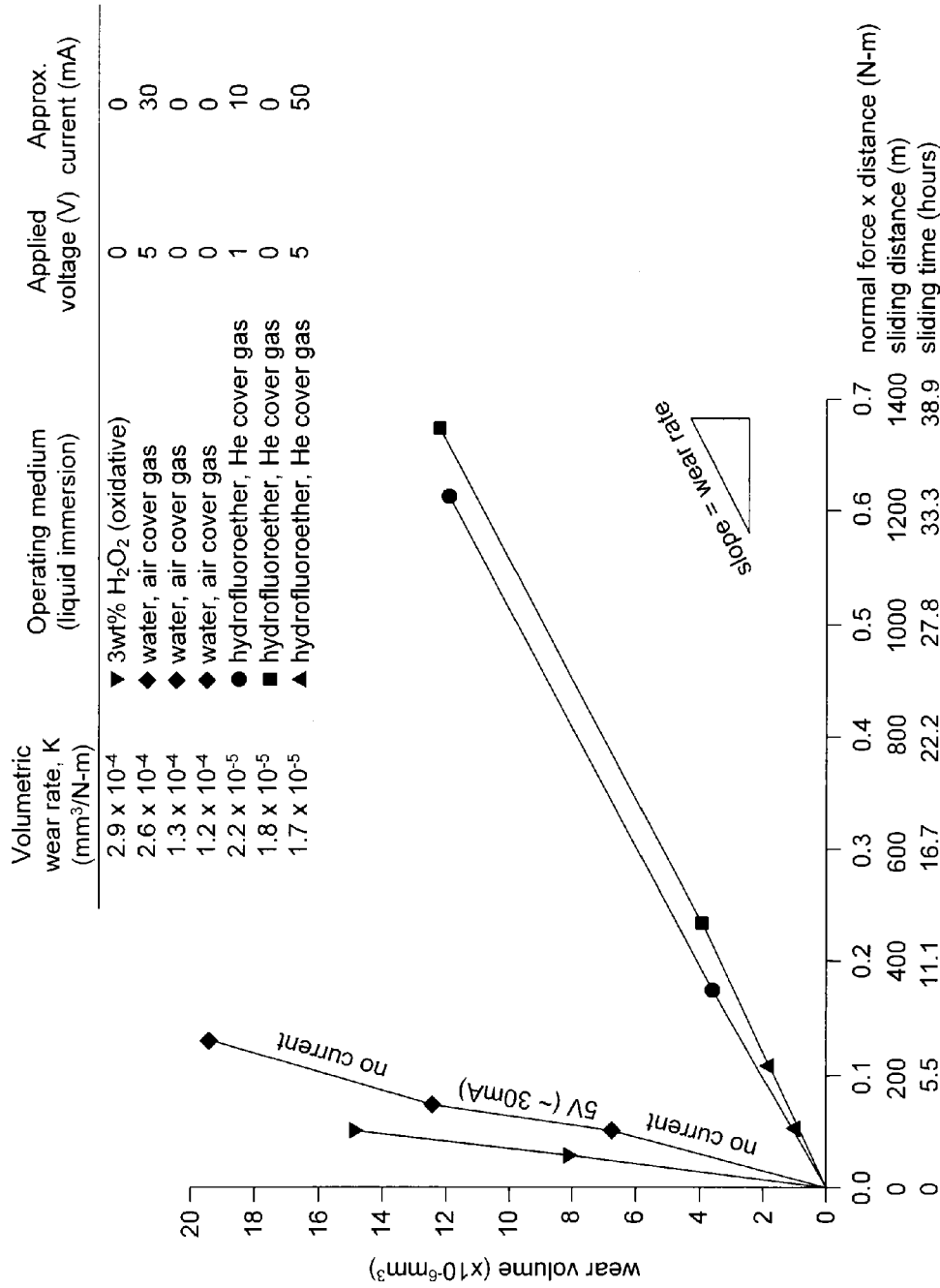
FIG. 3 is a graph that plots wear rates observed in experiments.

Testing was performed to confirm that systems such as those described above can reduce wear in metal-metal sliding contacts. In that testing, a copper-beryllium fiber was pressed against a rotating copper disc. In each experiment, the fiber had a diameter of approximately 120 microns (μm), and a bend radius of approximate 3 millimeters (mm). The fiber was pressed against the disc with a force of approximately 0.5 newtons (N) and the disc was rotated at a speed of approximately 10 mm/second. The contacts were independently submersed in hydrogen peroxide, water, and a hydrofluoroether. As can be appreciated from the graph of FIG. 3, significantly less wear resulted when the hydrofluorether was used to lubricate the contacts.

Figure 4:
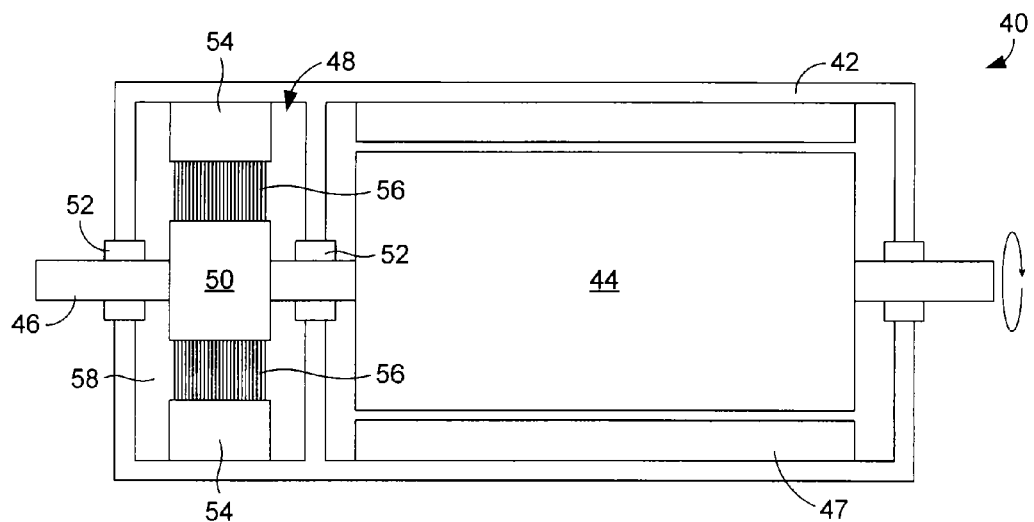
FIG. 4 is a schematic side view of an embodiment of a motor that incorporates a metal sliding contact system.

FIG. 4 illustrates an example component that incorporates a sliding contact system of the type described above. More particularly, FIG. 4 illustrates a motor 40, such as a brushed DC motor, that incorporates a sliding contact system. As shown in FIG. 4, the motor 40 includes an outer housing 42 that houses an armature 44 that is mounted to a central shaft 46. Surrounding the armature 44 are stator magnets 47 (only one magnet visible in FIG. 4).

The motor 40 further comprises a sealed compartment 48 that contains a commutator 50, which is also mounted to the shaft 46. The compartment 48 is sealed around the shaft 46 with airtight bearings 52. Also provided within the compartment 48 are brushes 54 that include bristles 56 that make physical contact the outer surface of the commutator 50 while it rotates with the shaft. In such an arrangement, the commutator 50 can be considered to comprise a first contact and the brushes 54 can be considered to comprise second contacts.

To reduce wear of the commutator 50 and the brushes 54, the commutator and brushes are immersed in a fluid 58 that prevents oxygen from reaching the contacts. In some embodiments, the fluid is a liquid lubricant or a gas that is saturated with a lubricant that can condense on the contacts.

Figure 5:
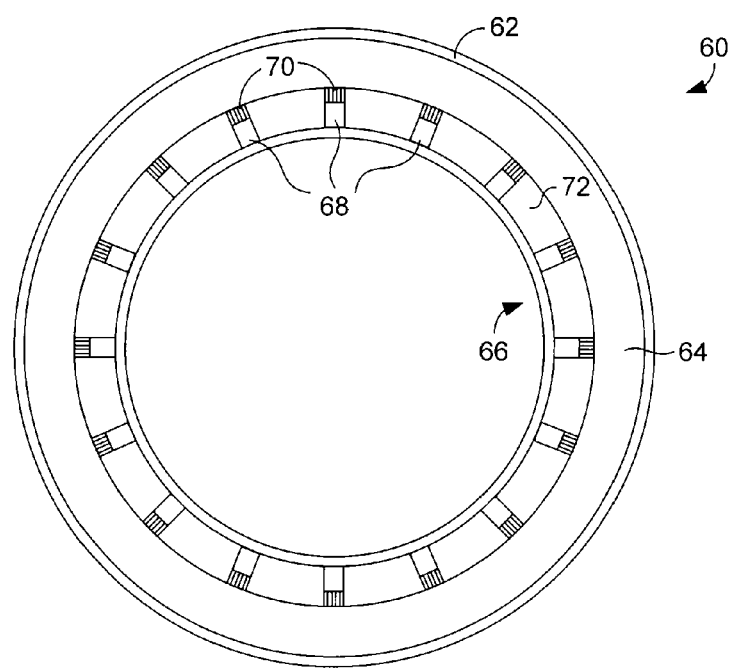
FIG. 5 is a schematic end view of an embodiment of a generator that incorporates a metal sliding contact system.

FIG. 5 illustrates a further example component that incorporates a sliding contact system of the type described above. More particularly, FIG. 5 illustrates a generator 60, such as a generator that could be used in a wind turbine. As shown in FIG. 5, the generator 60 includes an outer housing 62 that houses slip rings 64 (only one slip ring visible). Positioned within the slip rings 64 is a contact element 66 that supports multiple brushes 68 that each comprise multiple bristles 70, which make contact with the slip rings. In such an arrangement, the slip rings 64 can be considered to comprise first contacts and the brushes 68 can be considered to comprise second contacts.

The space between the slip rings 64 and the contact element 66 is sealed and contains a fluid 72 that prevents oxygen from reaching the contacts. In some embodiments, the fluid is a liquid lubricant or a gas that is saturated with a lubricant that can condense on the contacts.

Although various embodiments have been described above, it is to be understood that alternative embodiments are possible. The present disclosure is intended to extend to all such embodiments. For example, in further embodiments, an additive, such as acetic acid, can be added to the lubricant to remove corrosion that may form on the contacts.

We claim:

1. A sliding contact system comprising:
   a first metal contact comprising a concave metal surface;

a second metal contact comprising a plurality of solid metal bristles that are substantially aligned along a length of the plurality of solid metal bristles, where individual bristles of the plurality of solid metal bristles extend from a proximal end to a tip at a distal end that is in sliding engagement with the concave metal surface of the first metal contact, the plurality of solid metal bristles of the second metal contact comprising a metal that is harder than the concave metal surface of the first metal contact;

a lubricant in which the distal end of the solid metal bristles and the concave metal surface of the first metal contact are immersed to inhibit oxidation and cold welding of the first and second metal contacts; and a cooling fluid delivered via at least one passage formed beneath the concave metal surface.

2. The sliding contact system of claim 1, wherein the first metal contact is a solid member.

3. The sliding contact system of claim 1, wherein the first metal contact is a commutator.

4. The sliding contact system of claim 1, wherein the first metal contact is a slip ring.

5. The sliding contact system of claim 1, comprising a brush assembly including a plurality of the second metal contacts distributed about and extending radially outward from a circumference of the brush assembly; wherein the plurality of solid metal bristles of the plurality of second metal contacts are in sliding engagement with the concave metal surface of the first metal contact.

6. A sliding contact system comprising:

a first metal contact;

a second metal contact comprising a plurality of metal bristles that are substantially aligned along a length of the plurality of metal bristles, where individual bristles of the plurality of metal bristles extend from a proximal end to a tip at a distal end that is in sliding engagement with a metal surface of the first metal contact, the plurality of metal bristles of the second metal contact comprising a metal that is harder than the metal surface of the first metal contact; and a liquid lubricant in which the distal end of the metal bristles and the metal surface of the first metal contact are immersed when in sliding engagement to inhibit oxidation and cold welding of the first and second metal contacts, wherein the liquid lubricant comprises a fluorinated liquid.

7. The sliding contact system of claim 6, wherein the lubricant comprises an alcohol.

8. The sliding contact system of claim 6, wherein the fluorinated liquid comprises a hydrofluoroether.

9. The sliding contact system of claim 6, wherein the first and second metal contacts are submerged in the liquid lubricant.

10. The sliding contact system of claim 6, comprising a gas that is saturated with the liquid lubricant that condenses on surfaces of the first or second metal contacts.

11. The sliding contact system of claim 10, wherein the gas is an inert gas that contains no oxygen.

12. The sliding contact system of claim 6, further comprising a sealed casing or housing that prevents escape and evaporation of the liquid lubricant to the atmosphere.

13. A method of reducing wear of metal sliding contacts, the method comprising:

providing a first metal sliding contact in physical contact with a second metal sliding contact, an end surface of the second metal sliding contact in sliding engagement with a surface of the first metal sliding contact, where the second metal sliding contact comprises a plurality of solid metal bristles and the plurality of solid metal bristles of the second metal sliding contact comprise a metal that is harder than a surface of the first metal sliding contact that is in contact with the plurality of solid metal bristles; and immersing the first and second metal sliding contacts in a liquid lubricant that prevents oxygen from reaching the contacts, inhibits oxidation, and inhibits cold welding of the contacts when the end surface of the second metal sliding is contact in sliding engagement with the surface of the first metal sliding contact, wherein the liquid lubricant comprises a fluorinated liquid.

14. The method of claim 13, wherein immersing the first and second metal sliding contacts comprises submerging the first and second metal sliding contacts in the liquid lubricant.

15. The method of claim 13, wherein immersing the first and second metal sliding contacts comprises immersing the first and second metal sliding contacts in a gas that is saturated with the liquid lubricant that condenses on the contacts.

16. The method of claim 13, wherein the liquid lubricant comprises an alcohol.

17. The method of claim 13, wherein the surface of the first metal sliding contact is a concave surface in sliding engagement with the end surface of the second metal sliding contact.

18. The method of claim 13, wherein the fluorinated liquid comprises a hydrofluoroether.

19. The method of claim 13, wherein the plurality of metal bristles are substantially aligned along a length of the plurality of solid metal bristles, where distal ends of the plurality of solid metal bristles form the end surface in sliding engagement with the surface of the first metal sliding contact.

20. The method of claim 13, wherein the first metal sliding contact comprises copper and the plurality of solid metal bristles of the second metal sliding contact comprise beryllium copper.

* * * * *